United States Patent [19]

Hattori

[11] Patent Number: 5,133,697
[45] Date of Patent: Jul. 28, 1992

[54] PLANETARY GEAR SYSTEM

[75] Inventor: Noboru Hattori, Yokosuka, Japan

[73] Assignee: Nissan Motor Co., Ltd., Yokohama, Japan

[21] Appl. No.: 510,249

[22] Filed: Apr. 18, 1990

[30] Foreign Application Priority Data

May 2, 1989 [JP] Japan .................................. 1-113109
Feb. 9, 1990 [JP] Japan .................................. 2-31149

[51] Int. Cl.$^5$ .......................................... F16H 57/10
[52] U.S. Cl. ................................... 475/276; 475/281;
475/313; 475/325; 475/290
[58] Field of Search ................ 475/276, 279, 280–287,
475/290–292, 312, 313, 318, 319, 324, 325, 330,
338, 10

[56] References Cited

U.S. PATENT DOCUMENTS

| | | | |
|---|---|---|---|
| 2,220,174 | 11/1940 | Ravigneaux | 74/268 |
| 2,631,476 | 3/1953 | Ravigneaux | 74/759 |
| 2,761,333 | 9/1956 | Ravigneaux | 74/759 |
| 2,827,805 | 3/1958 | Miller | 475/282 |
| 2,847,877 | 8/1958 | Ravigneaux | 74/759 |
| 2,871,726 | 2/1959 | Kamlukin . | |
| 2,873,625 | 2/1959 | Simpson | 71/763 |
| 2,901,923 | 9/1959 | Waclawek . | |
| 3,106,107 | 10/1963 | Hardy . | |
| 3,299,746 | 1/1967 | Konrad | 74/758 |
| 3,597,999 | 8/1971 | Fisher . | |
| 3,763,719 | 10/1973 | Malloy . | |
| 3,853,023 | 12/1974 | Mori et al. | 74/759 |
| 3,971,267 | 7/1976 | Murakami et al. | 475/276 |
| 3,979,974 | 9/1976 | Murakami | 74/759 |
| 3,987,690 | 10/1976 | Murakami et al. | 475/276 |
| 3,999,448 | 12/1976 | Murakami et al. | 475/276 |
| 4,004,473 | 1/1977 | Pearce et al. | 475/276 X |
| 4,038,887 | 8/1977 | Murakami et al. | 475/276 |
| 4,345,490 | 8/1982 | Madson . | |
| 4,417,484 | 11/1983 | Gaus et al. | 74/688 |
| 4,638,688 | 1/1987 | Hiraiwa | 74/763 |
| 4,653,347 | 3/1987 | Hiraiwa | 74/759 |
| 4,653,348 | 3/1987 | Hiraiwa | 74/759 |
| 4,660,439 | 4/1987 | Hiraiwa | 74/763 |
| 4,802,385 | 2/1989 | Hiraiwa | 74/758 |
| 4,843,909 | 7/1989 | Hasegawa et al. | 475/119 |

FOREIGN PATENT DOCUMENTS

| | | |
|---|---|---|
| 3822319A1 | 1/1989 | Fed. Rep. of Germany . |
| 50-64660 | 5/1975 | Japan . |
| 52-149562 | 12/1977 | Japan . |
| 61-117950 | 7/1986 | Japan . |
| 61-502274 | 10/1986 | Japan . |
| 63-88353 | 4/1988 | Japan . |

Primary Examiner—Richard Lorence
Assistant Examiner—Benjamin Levi
Attorney, Agent, or Firm—Foley & Lardner

[57] ABSTRACT

A planetary gear system has seven members rotatable relative to one another, one stationary member, and five selective engaging devices each disposed between two of the members. Each member contains one or more of elements which are input and output elements, a stationary element, and a plurality of active elements, such as sun gears, ring gears, and planet carriers, constituting a planetary gear arrangement connected between the input and output elements for providing a plurality of forward gear ratios and at least one reverse gear ratio. With the eight members and the five selective engaging devices, the planetary gear system makes it possible to attain desired gear ratio values for all the speeds.

36 Claims, 11 Drawing Sheets

FIG. 3

|   |   | C1 | C2 | C3 | B1 | B2 | B3 | F1 | F2 |
|---|---|----|----|----|----|----|----|----|----|
| R |   |    |    |    | ○  |    | ○  |    |    |
| N |   |    |    |    |    |    | ○  |    |    |
| D | 1 |    |    | ○  |    |    |    | ⊘  | ⊘  |
| D | 2 |    |    | ○  |    | ○  |    | ⊘  |    |
| D | 3 |    |    | ○  | ○  |    |    | ⊘  |    |
| D | 4 | ○  |    | ○  |    |    |    | ⊘  |    |
| D | 5 | ○  |    |    | ○  |    |    |    |    |
| D | 6 | ○  |    |    |    | ○  |    |    |    |
| 4 | 1 |    | ◎  | ○  |    |    |    | ⊘  | ⊘  |
| 4 | 2 |    | ◎  | ○  |    | ○  |    | ⊘  |    |
| 4 | 3 |    | ◎  | ○  | ○  |    |    | ⊘  |    |
| 4 | 4 | ○  | ◎  | ○  |    |    |    | ⊘  |    |
| 3 | 1 |    | ◎  | ○  |    |    |    | ⊘  | ⊘  |
| 3 | 2 |    | ◎  | ○  |    | ○  |    | ⊘  |    |
| 3 | 3 |    | ◎  | ○  | ○  |    |    | ⊘  |    |
| 2 | 1 |    | ○  | ○  |    |    | ○  | ⊘  |    |
| 2 | 2 |    | ○  | ○  |    | ○  |    | ⊘  |    |

○ --- ENGAGED

⊘ --- OPERATED DURING DRIVE

◎ --- ENGAGED WHEN TVO ≤ 1/16

$$i_R = -\frac{1-a_2}{a_1 \cdot a_2}$$

$$i_1 = \frac{a_3 + k}{a_3}$$

$$i_2 = \frac{a_2 k + a_3}{a_3}$$

$$i_3 = \frac{a_2 k + a_3}{a_1 \cdot a_2 k + a_3}$$

$$i_4 = 1.000$$

$$i_5 = \frac{1 - a_1 k}{1 - a_1 \cdot a_2 k}$$

$$i_6 = 1 - a_2 k$$

|   | C1 | C2 | C3 | B1 | B2 |
|---|----|----|----|----|----|
| R |    |    | ○  |    | ○  |
| N |    |    |    |    | ○  |
| 1 |    | ○  |    |    | ○  |
| 2 |    | ○  |    | ○  |    |
| 3 |    | ○  | ○  |    |    |
| 4 | ○  | ○  |    |    |    |
| 5 | ○  |    | ○  |    |    |
| 6 | ○  |    |    | ○  |    |

|   | C1 | C2 | C3 | B1 | B2 |
|---|----|----|----|----|----|
| R |    |    | ○  | ○  |    |
| N |    |    |    | ○  |    |
| 1 | ○  |    |    | ○  |    |
| 2 | ○  |    |    |    | ○  |
| 3 | ○  |    | ○  |    |    |
| 4 | ○  | ○  |    |    |    |
| 5 |    | ○  | ○  |    |    |
| 6 |    | ○  |    |    | ○  |

FIG.16
(Prior Art)

| | C1 | C2 | C3 | B1 | B2 | GEAR RATIO |
|---|---|---|---|---|---|---|
| 1 | ○ | | | | ○ | $1 + \dfrac{1}{A}$ |
| 2 | ○ | | | ○ | | $1 + \dfrac{1}{A+B}$ |
| 3 | ○ | | ○ | | | $\dfrac{(1+A+B)(1+C)}{C+(A+B)(1+C)}$ |
| 4 | ○ | ○ | | | | 1 |
| 5 | | ○ | ○ | | | $\dfrac{B(1+C)}{A+B(1+C)}$ |
| 6 | | ○ | | ○ | | $\dfrac{B}{A+B}$ |
| R | | | ○ | | ○ | $-\dfrac{B(1+C)}{AC}$ |

PLANETARY GEAR SYSTEM

REFERENCE TO RELATED APPLICATION

A commonly assigned U.S. patent application Ser. No. 07/482,976, filed on Feb. 22, 1990 relates to the subject matter similar to that of the present application.

BACKGROUND OF THE INVENTION

The present invention relates to planetary gear systems, and more specifically to planetary gear systems used in automatic transmissions of motor vehicles.

Japanese Patent Provisional (unexamined, KOKAI) Publication No. 52-149562 discloses one conventional example. A planetary gear system of this example uses three single pinion type planetary gear sets as shown in FIG. 14. The planetary gear system has six rotatable members M1, M2, M4, M5, M6 and M7. The third member is named M4 instead of M3 in order to facilitate the comparison with the present invention. The member M7 is a driving member including an input shaft, and connected to the members M1, M4, respectively, through first and second clutches C1 and C2. The members M6, M5 and M4 are connected to the stationary housing through first, second and third brakes B1, B2 and B3, respectively. The member M2 is a driven member including an output shaft.

FIG. 15 is a nomographic chart of the gear system shown in FIG. 14. In this chart, the ratio of the horizontal distance between the positions of the members M2 and M4 to the horizontal distance between the positions of the members M1 and M2 is equal to A, and the ratio of the horizontal distance between the positions of the members M4 and M5 to the horizontal distance between the positions of the members M1 and M2 is equal to B. The ratio of the horizontal distance between the positions of the members M5 and M6 to the horizontal distance between the positions of the members M7 and M5 is equal to C. The ratios A, B and C are determined according to sizes $a_1$, $a_2$ and $a_3$ of the first, second and third planetary gear sets. The size $a_1$ (=the number of teeth of the sun gear/the number of teeth of the ring gear) of the first planetary gear set constituted by the members M5, M6 and M7 is equal to C. The size $a_2$ of the second planetary gear set constituted by the members M1, M4 nd M5 is B divided by (1+A). The size $a_3$ of the third planetary gear set constituted by the members M1, M2 and M4 is equal to A. Thus:

$$a_1 = C, \ a_2 = B/(1+A), \ a_3 = A$$

In this conventional planetary gear design, however, it is very difficult to obtain satisfactory gear ratios. The first, second, third, fifth and sixth forward gear ratios and the reverse gear ratio are related by three constraint conditions regarding $a_1$, $a_2$, $a_3$, and determined by the three variables A, B and C. Therefore, it is very difficult to make all the gear ratios equal to desirable values simultaneously. When, for example, the first speed gear ratio is set equal to 3.0, the second gear ratio is set equal to 1.9, and the third gear ratio is set equal to 1.32, then A=0.5, B=0.61, and C=0.954, and consequently, the fifth speed gear ratio becomes equal to 0.704, and the reverse gear ratio becomes equal to 2.50. This value of the fifth gear ratio is outside the desired range between 0.76 and 0.82, and the value of the reverse gear ratio is also outside the desired range between 2.25 and 4.2. Thus, the resulting fifth gear ratio is so low (high gear), that the driving power becomes insufficient at high vehicle speeds. The gear ratios of the different speeds are related to one another. Therefore, it is not possible to improve the fifth gear ratio without adversely affecting some other gear ratios. For example, it is possible to make the fifth gear ratio equal to a desired value of 0.760, by setting C equal to 1.6. In this case, however, the third gear ratio becomes equal to 1.223, and the reverse gear ratio becomes 1.983. These results are not in the respective desired ranges.

SUMMARY OF THE INVENTION

It is therefore an object of the present invention to provide a planetary gear system which can easily provide optimum gear ratios for all the speeds.

According to the present invention, a planetary gear system comprises (i) a stationary housing element such as an element constituting a gear housing on a transmission case, (ii) an input element such as an input shaft for receiving an input rotation, (iii) an output element such as an output shaft for delivering an output rotation, (iv) an planetary gear arrangement which is connected between the input and output elements for providing a plurality of forward gear ratios and at least one reverse gear ratio, and which comprises a plurality of active rotatable elements such as sun gears, ring gears and planet carriers, (v) a means for connecting the stationary, input, output and active elements so as to form first, second, third, fourth, fifth, sixth, seventh and eighth members which are rotatable relative to one another, and (vi) five selective engaging devices such as clutches and brakes. The eighth member comprises the stationary housing element, so that the eighth member is stationary. Each of the first through seventh members is rotatable, as a unit, relative to the stationary element. Each of the five selective engaging devices is disposed between two of the eight members for connection and disconnection therebetween.

In the planetary gear system according to the present invention, the number of the rotatable members is seven, so that the gear ratios can be determined more freely as compared with the conventional system having only six rotatable members. The number of the selective engaging devices required for providing a plurality of forward gear ratios and one reverse gear ratio remains equal to five, so that the gear system of the invention is advantageous in compactness and simplicity.

BRIEF DESCRIPTION OF THE DRAWINGS

FIG. 3 is a logic table showing engagement and disengagement of clutches and brakes of the first embodiment.

FIG. 16 is an engagement logic table of the conventional planetary gear system.

DETAILED DESCRIPTION OF THE INVENTION

Figure 1:
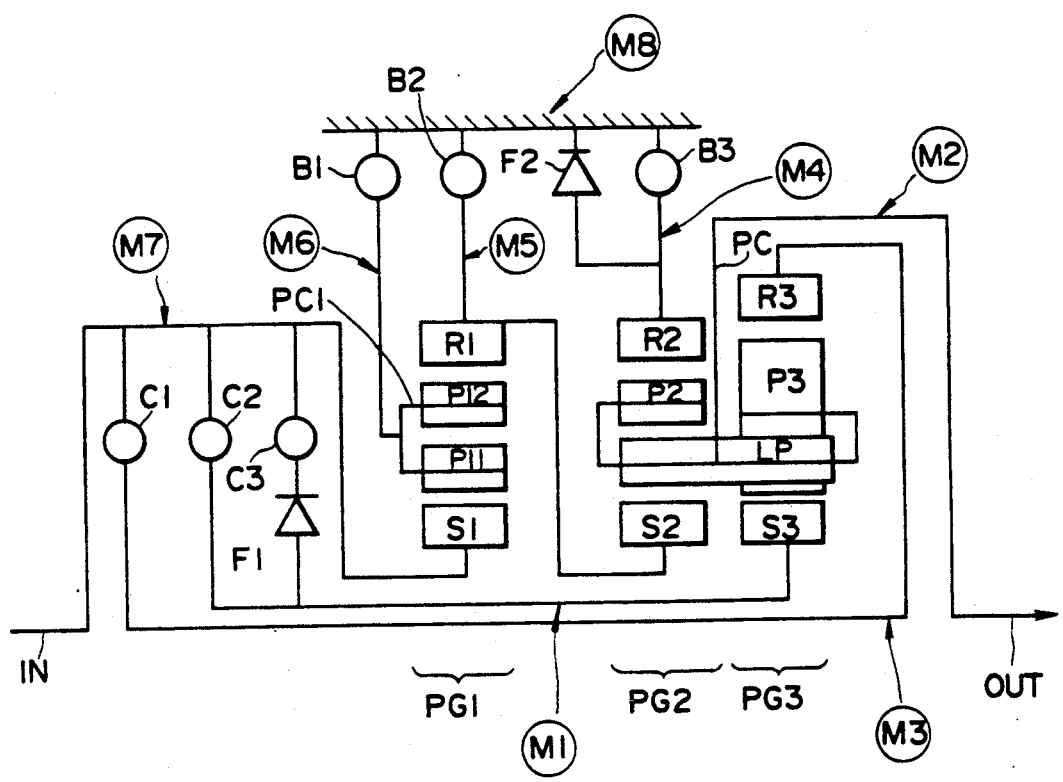
FIG. 1 is a skeleton diagram showing a planetary gear system according to a first embodiment of the invention.
Figure 2:
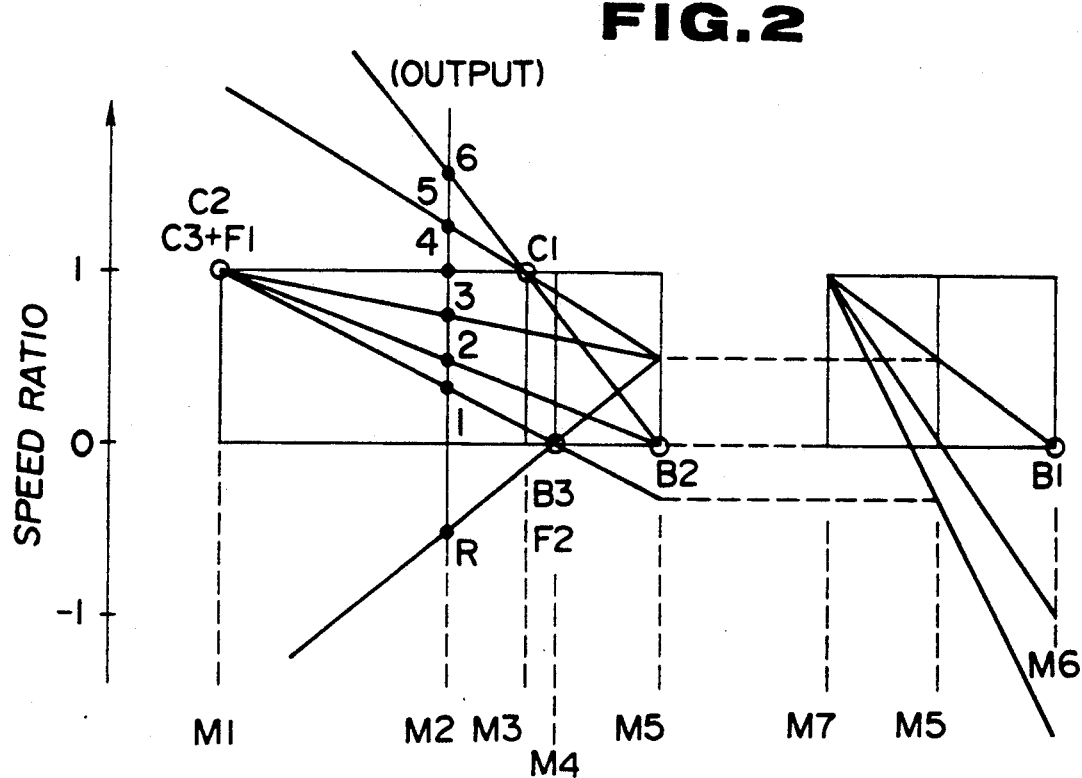
FIG. 2 is a nomographic chart of the first embodiment.

A FIRST EMBODIMENT of the present invention is shown in FIGS. 1, 2 and 3.

As shown in the skeleton (symbol) diagram of FIG. 1, the planetary gear system of the first embodiment has an input element in the form of an input shaft IN for receiving an input torque, an output element in the form of an output shaft OUT for delivering an output torque, and first, second and third planetary gear sets PG1, PG2 and PG3 which are connected between the input and output shafts IN and OUT. In this embodiment, the input and output shafts IN and OUT are in line with each other, and the three planetary gear sets PG1, PG2 and PG3 are placed between one end of the input shaft IN, and one end of the output shaft OUT. The planetary gear system further includes five main selective engaging devices and three auxiliary engaging devices. The five main engaging devices are a first clutch C1, a third clutch C3, a first brake B1, a second brake B2 and a third brake B3. These main engaging devices are used to achieve six forward gear ratios and one reverse gear ratio. The three auxiliary engaging devices are a first one-way clutch F1, a second one-way clutch F2 and a second clutch C2. The first and second one-way clutches F1 and F2 are designed to improve the shift quality of the transmission, and the second clutch C2 is to control the braking effect of the engine of the vehicle.

The input and output elements IN and OUT, and rotatable active elements of the first, second and third planetary gear sets PG1, PG2 and PG3 are connected by connecting means so as to form seven rotatable members M1, M2, M3, M4, M5, M6 and M7 which are rotatable relative to one another. The planetary gear system further includes a stationary housing (or case) element which constitutes a stationary eighth member M8. Each of the seven rotatable members M1-M7 is rotatable, as a unit, relative to the stationary eighth member M8.

The first planetary gear set PG1 of this embodiment is a double pinion type, and has a first sun gear S1, a first ring gear R1, and a first pinion carrier PC1 carrying pinion groups each of which includes an inner first pinion P11 and an outer first pinion P12. The inner first pinion P11 meshes with the first sun gear S1, and the outer first pinion P12 meshes with both the inner first pinion P11 and the first ring gear R1. Thus, the first planetary gear set PG1 includes three active elements, S1, R1 and PC1.

The second and third planetary gear sets PG2 and PG3 are combined into a compound planetary gear train. In this embodiment the compound planetary gear train serves as a primary planetary gear train, and the first planetary gear set p61 serves as an auxiliary planetary gear set. The second planetary gear set PG2 includes a second ring gear R2, a second sun gear S2 and a second pinion carrier. The third planetary gear set PG3 includes a third ring gear R3, a third sun gear S3 and a third pinion carrier. The second and third pinion carriers are integrated into a common pinion carrier PC. The common carrier PC carries pinion groups each including a short second pinion P2, a short third pinion P3 and a stepless long pinion LP. In the second planetary gear set PG2, the second short pinion P2 meshes with both the second ring gear R2 and the long pinion LP, and the long pinion LP meshes with both the short second pinion P2 and the second sun gear S2 in such a manner that power can be transmitted. In the third planetary gear set PG3, the third short pinion P3 meshes with both the third ring gear R3 and the third sun gear S3, and the long pinion LP meshes with the third pinion P3. In the first embodiment, the third ring gear S3, the common carrier PC, the third ring gear R3, the second ring gear R2, and the second sun gear S2 serve, respectively as first, second, third, fourth and fifth active elements. The first carrier PC1, serves as a sixth active element, the first ring gear R1 serves as a seventh active element, and the first sungear S1 serves as an eighth active element.

The first rotatable member M1 comprises the third sun gear S3 and a part such as a drum attached to the third sun gear S3. The first member M1 is a one-element unit which includes only one active element in the form of the third sun gear S3, and does not include any other elements. The second rotatable member M2 comprises the common carrier PC, the output shaft OUT and a means for directly connecting the common carrier PC with the output shaft OUT. The second member M2 is a two-element unit including the active element in the form of the common carrier PC and the output element OUT. The third rotatable member M3 comprises the third ring gear R3 and a part attached to the third ring gear R3. The fourth rotatable member M4 comprises the second ring gear R2 and a part attached thereto. The third and fourth members are one-element units. The fifth rotatable member M5 of the first embodiment comprises the first ring gear R1, the second sun gear S2, and a means for connecting the first ring gear R1 and the second sun gear S2. The sixth member M6 of this embodiment is a two-element unit. The sixth rotatable member M6 comprises the first carrier PC1, and a part attached thereto. The seventh rotatable member M7 comprises the first sun gear S1, the input shaft IN and a means which connects the first sun gear S1 and the input shaft IN.

The first clutch C1 is provided between the third rotatable member M3 and the seventh rotatable member M7, and capable of connecting both members and disconnecting one member from the other. The second clutch C2 is provided between the first rotatable member M1 and the seventh rotatable member M7, for connection and disconnection therebetween. The third clutch C3 is connected in series with the first one-way clutch F1, and this series combination is provided between the first rotatable member M1, and the seventh rotatable member M7, for connection and disconnection therebetween.

The first brake B1 is provided between the sixth rotatable member M6 and the stationary eighth member M8, for connection and disconnection therebetween. The second brake B2 is provided between the fifth rotatable member M5 and the stationary member M8, for connection and disconnection therebetween. The third brake B3 and the second one-way clutch F2 are connected in parallel to each other between the fourth member M4 and the stationary member M8, for connection and disconnection therebetween.

The planetary gear system of the first embodiment is operated as follows:

FIG. 2 is a nomographic chart of the first embodiment. Along the horizontal axis (x-axis) of the lefthand graph shown in FIG. 2, positions are assigned to the rotatable members M1, M2, M3, M4 and M5 according to preset gear ratios. The vertical axis (y-axis) expresses a rotational speed ratio which is a ratio of the rotational speed of each rotatable member to the input rotational speed. The second clutch C2, and the series combination of C3 and F1 are placed at the position of the first member M1. The main selective engaging device placed at the position of M1 is referred to as a first selective engaging device. The first clutch C1 is placed at the position of the third member M3, and serves as a second selective engaging device. The third brake B3 and the second one-way clutch F2 are placed at the position of the fourth member M4. The third brake B3 serves as a third selective engaging device. The second brake B2 is placed at the position of the fifth member M5, and serves as a fourth selective engaging device. The speed ratio equal to one means the input speed. The speed ratio of zero means that the rotatable member concerned is grounded or held to the stationary housing member M8.

In the righthand graph shown in FIG. 2, the positions of the rotatable members M7, M5 and M6 are determined along the horizontal axis in the same manner. The seventh rotatable member M7 is integrated with the input shaft IN, and the first brake B1 is placed at the position of the sixth member M6. The first brake B1 serves as a fifth selective engaging device. U.S. Pat. Nos. 4,638,688 and 4,653,347 offer explanations about the nomographic charts (or nomograms). These explanations are herein incorporated by reference.

FIG. 3 is an engagement logic table of the planetary gear system of the first embodiment. As shown in FIG. 3, the planetary gear system of the first embodiment can provide a first speed by engaging the third clutch C3 and the third brake B3, a second speed by engaging C3 and B2, a third speed by engaging C3 and B1, a fourth speed by engaging C3 and C1, a fifth speed by engaging C1 and B1, a sixth speed by engaging C1 and B2, and a reverse speed by engaging B1 and B3. It is possible to obtain a seventh speed by engaging C1 and B3. However, the first embodiment does not employ the seventh speed in view of the balance among the gear ratios. It is possible to put the gear train in neutral by engaging none or only one of the selective engaging devices. In this embodiment, the third brake B3 is engaged in neutral so that each of the shift to the first speed, and the shift to reverse can be accomplished by engaging only one of the selective engaging devices. The gear system of this embodiment has the second one-way clutch F2. Therefore, the first speed can be obtained without engaging the third brake, B3, as evident from the nomographic chart of FIG. 2.

In this way, the planetary gear system of the first embodiment provides one reverse gear ratio $i_R$ and six forward gear ratios $i_1$-$i_6$ as shown in FIG. 3. In the mathematical formulae for the gear ratios; $a_1$ is a ratio of the number of teeth $Zs1$ of the first sun gear S1 to the number of teeth $Zr1$ of the first ring gear R1 ($a_1 = Zs1/Zr1$), $a_2$ is a ratio of the number of teeth $Zs2$ of the second sun gear S2 to the number of teeth $Zr2$ of the second ring gear R2 ($a_2 = Zs2/Zr2$), $a_3$ is a ratio of the number of teeth $Zs3$ of the third sun gear S3 to the number of teeth $Zr3$ of the third ring gear R3, and $k = (Zr2.Zlp3)/(Zr3.Zlp2)$ where $Zlp2$ is the number of teeth of the long pinion LP meshing with the second planetary gear set PG2, and $Zlp3$ is the number of teeth of the long pinion LP meshing with the third planetary gear set PG3. The ratios $a_1$, $a_2$, $a_3$ and $k$ are respectively, indicative of the sizes of the first planetary gear set PG1, the second planetary gear set PG2, the third planetary gear set PG3 and an imaginary (equivalent) fourth planetary gear set PG4 constituted by the second and third ring gear R2 and R3 and the common carrier PC. In the fourth planetary gear set PG4, the rotational speed Nr2 of the second ring gear R2, the rotational speed Nr3 of the third ring gear R3, and the rotational speed Npc of the common carrier PC are constrained by the following equation.

$$Nr3 - kNr2 = (1-k)Npc$$

That is, the fourth planetary gear set PG4 is of the double opinion type.

Therefore, in the nomographic chart of FIG. 2, the third member M3 comprising the third ring gear R3 which is one component of the fourth planetary gear set PG4 is positioned between the second member M2 which functions as the carrier of the fourth planetary gear set PG4, and the fourth member M4 comprising the second ring gear R2 which is one component of the fourth planetary set PG4. The ratio of the horizontal distance between M2 and M4 to the horizontal distance between M2 and M3 in the nomographic chart of FIG. 2 is $1/k$ as in an ordinary double pinion type planetary gear set. The third planetary gear set PG3 is a single pinion type planetary gear set, as evident from FIG. 1. Therefore, as seen in FIG. 2, the second member M2 serving as the carrier of the third gear set PG3 is positioned between the first member M1 including the third sun gear S3, and the third member M3 including the third ring gear R3. The ratio of the horizontal distance between M1 and M2 to the horizontal distance between M2 and M3 is $1/a_3$. The second planetary gear set PG2 is a double pinion planetary gear set. In the nomographic chart of FIG. 2, therefore, the fourth member M4 including the second ring gear R2 is positioned between the second member M2 serving as the carrier of the second gear set PG2, and the fifth member M5 comprising the second sun gear S2. The ratio of the horizontal distance between M2 and M5 to the horizontal distance between M4 and M5 is $1/a_2$. In this way, the positions of all the five members M1-M5 in the nomographic chart are determined by the second, third and fourth planetary gear sets PG2, PG3, and PG4. The first embodiment is advantageous in the following points.

Figure 15:
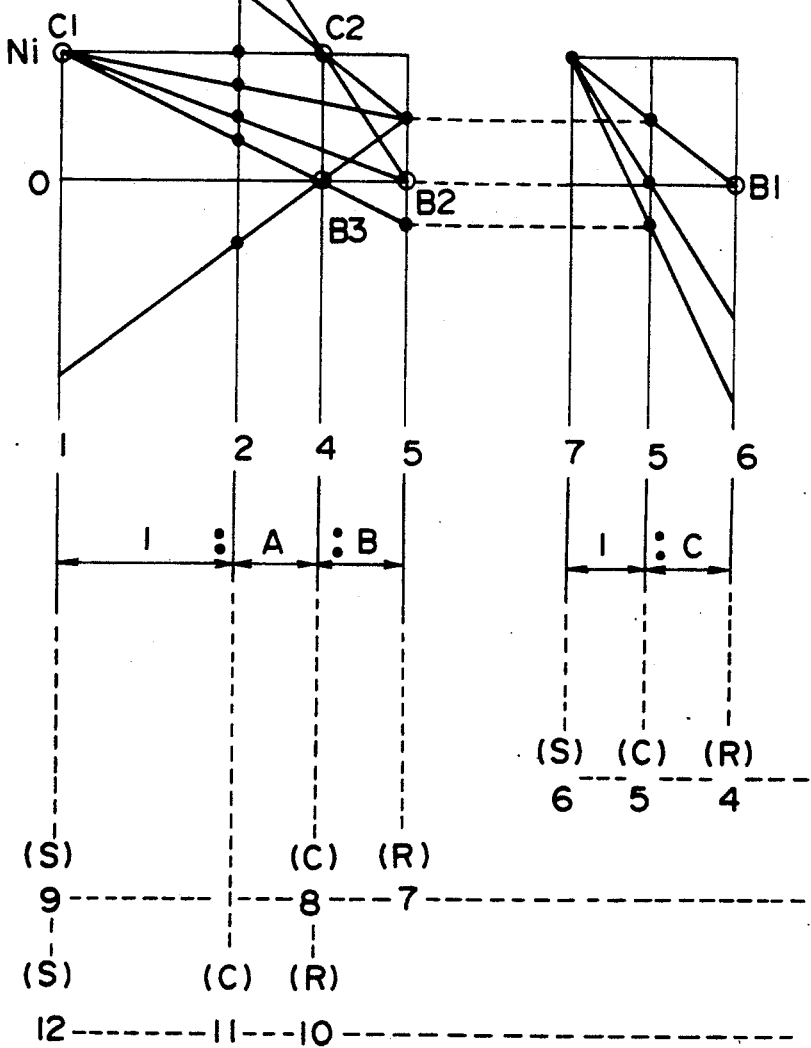
FIG. 15 is a nomographic chart of the conventional planetary gear system shown in FIG. 14.

The planetary gear system has seven rotatable members inclusive of the input and output shafts. Therefore, this gear system can increase the degree of freedom of selection of gear ratios, and make it easier to obtain optimum gear ratios for all the speeds without increasing the number of the selective engaging elements required to produce the six forward speeds and one reverse speed, as compared with the conventional system requiring five. In the planetary gear system of the first embodiment having seven rotatable members, the lefthand nomograph shown in FIG. 2 has five different positions for five rotatable members along the horizontal axis, as contrasted with four positions of the conventional system shown in FIG. 15. Therefore, it is possible more freely to draw a line for constraining two of the rotatable members with two of the selective engaging devices. Thus, the degree of freedom of gear ratio selection is increased as understood from the lefthand nomograph having five rotatable member positions, and the gear ratio formulae including the ratio k in addition to $a_1$, $a_2$ and $a_3$.

The second and third planetary gear sets PG2 and PG3 have, in common, the long pinion LP connecting both gear sets, and they are combined into the compound planetary gear train including five members rotatable relative to one another. Therefore, the planetary gear system of the first embodiment requires only three planetary gear sets PG1, PG2 and PG3 to constitute the seven rotatable members M1-M7. Consequently, the planetary gear system of the first embodiment is compact in size, and especially short in axial dimension.

The shifting quality of this gear system is high because the shift from each forward speed to the next higher or lower speed can be achieved only by changing one selective engaging device from the engaged state to the disengaged state, and another selective engaging device from the disengaged state to the engaged state.

The first and second one-way clutches F1 and F2 have no direct relation to the gear ratios. The first one-way clutch F1 functions to improve the drivability by preventing the engine braking from acting against the driving power input from the road wheels. Furthermore, the first one-way clutch F1 facilitates the improvement of the shifting quality by making the 4-5 shift a one-way clutch shift (or a freewheel shift). The second one-way clutch can improve the shifting quality in the 1-2 shift involving a great torque difference by enabling a one-way clutch shift.

Figure 4:
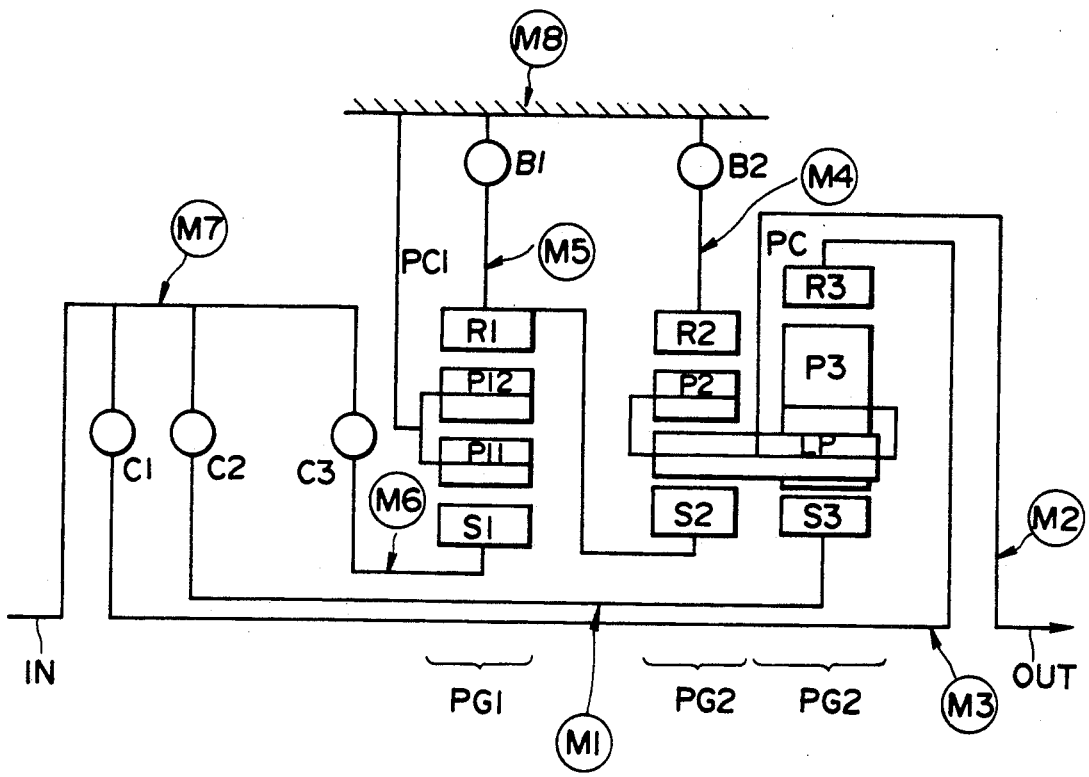
FIG. 4 is a skeleton diagram showing a planetary gear system of a second embodiment of the invention.
Figure 5:
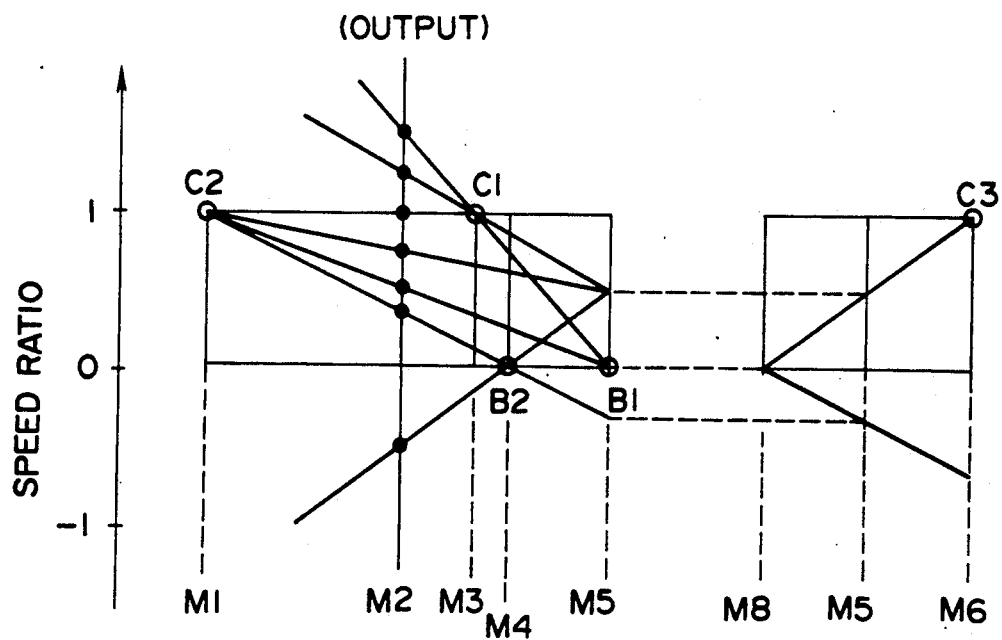
FIG. 5 is a nomographic chart of the second embodiment.
Figures 6, 7:
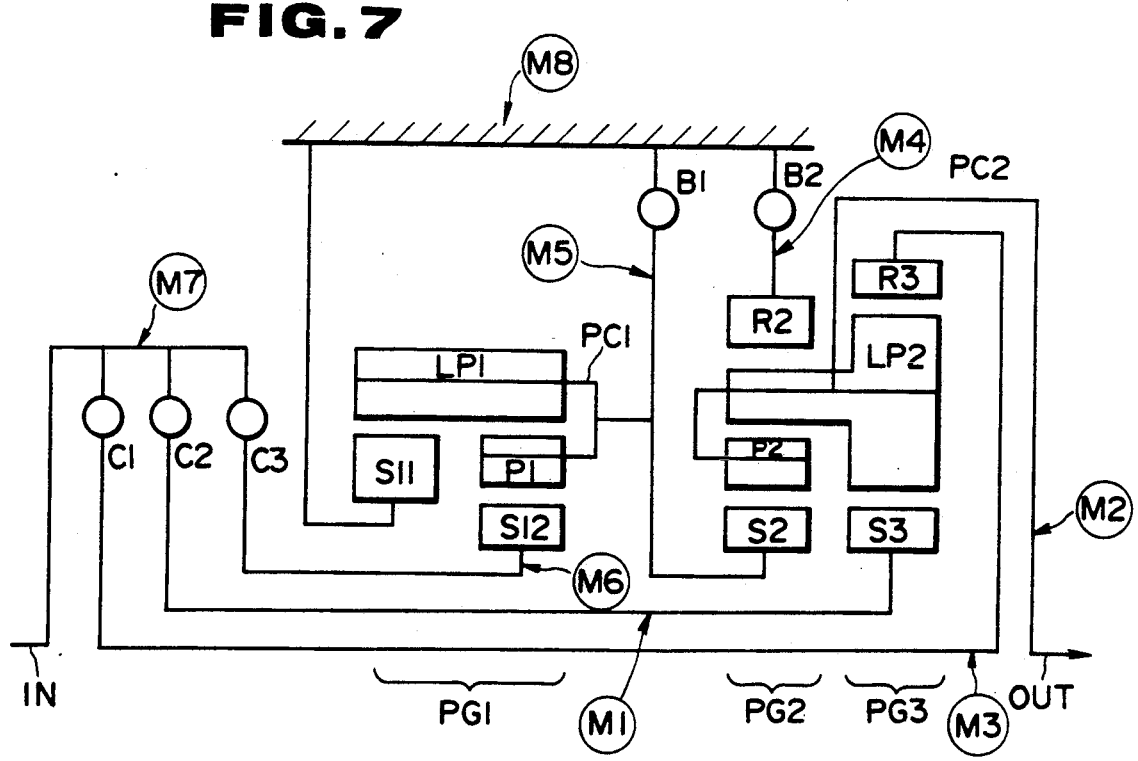
FIG. 6 is an engagement logic table of the second embodiment.
FIG. 7 is a skeleton diagram showing a planetary gear system of a third embodiment of the invention.

A SECOND EMBODIMENT of the present invention is shown in FIGS. 4, 5 and 6. In the skeleton diagram of FIG. 4, the parts relating to the one-way clutches are omitted. However, it is possible to employ one-way clutches in the second embodiment and the following embodiments, in the same manner as in the first embodiment. The planetary gear system of the second embodiment shown in FIG. 4 is almost the same as the planetary gear system of the first embodiment. The system of the second embodiment is different in construction from the system of the first embodiment in that one brake is eliminated, and one clutch is added.

The planetary gear system of the second embodiment employs first, second and third clutches C1, C2 and C3 and first and second brakes B1 and B2. The first clutch C1 is disposed between the third rotatable member M3 of the third ring gear R3, and the seventh rotatable member M7 of the input shaft IN, and the second clutch C2 is disposed between the first rotatable member M1 of the third sun gear S3, and the seventh member M7. The third clutch C3 serving as the fifth selective engaging device is disposed between the sixth rotatable member M6 of the first sun gear S1 and the seventh rotatable member M7. The first brake B1 is disposed between the stationary housing member M8, and the fifth rotatable member M5 including the first ring gear R1 and the second sun gear S2. The second brake B2 is disposed between the stationary housing member M8, and the fourth member M4 of the second ring gear R2. The first carrier PC1 is directly connected with the stationary housing member M8. In the second embodiment, S1 serves as the sixth active element, R1 serves as the seventh active element, and PC1 serves as the eighth active element.

The planetary gear system of the second embodiment can provide the same gear ratios as shown in the nomograph of FIG. 5, and ensure the high shifting quality as evident from the engagement logic table of FIG. 6. Thus, the planetary gear system of the second embodiment has all the advantages of the first embodiment gear system. Furthermore, the gear system of the second embodiment can reduce the rotational speed of the sixth member M6 in the first forward speed, to a relatively low level.

A THIRD EMBODIMENT of the present invention is shown in FIG. 7. The first planetary gear set PG1 of the third embodiment is different from that of the second embodiment, and the second and third planetary gear sets PG2 and PG3 are also different from those of the second embodiment. However, the relations among the rotatable members M5, M6 and M7 are the same between the second and third embodiments. Similarly, the relations among the rotatable members M1, M2, M3, M4 and M5 are the same.

The first planetary gear set PG1 of the third embodiment is of an external planetary type, and has three active elements, which are a large first sun gear S11, a small first sun gear S12, and a first planet carrier PC1. The first planet carrier PC1 carries pinion groups each including a first stepless long pinion LP1 and a short first pinion P1. The first large sun gear S11 is in mesh with the first long pinion LP1, and the first short pinion P1 is in mesh with both the first long pinion LP1 and the first small sun gear S12.

The second and third planetary gear sets PG2 and PG3 are integrated into a compound planetary gear set as in the preceding embodiments. The compound planetary gear set of the third embodiment is constituted by five active element, which are second and third sun gears S2 and S3, second and third ring gears R2 and R3, and a common second carrier PC2. The second carrier PC2 carries pinion groups each of which includes a short second pinion P2 and a stepped second long pinion LP2 having a smaller portion and a larger portion. The smaller portion of the second long pinion LP2 is in mesh with both the second ring gear R2 and the second short pinion P2, which is in mesh with the second sun gear S2. The larger portion of the second long pinion LP2 is in mesh with both the third ring gear R3 and the third sun gear S3.

In the third embodiment, the first rotatable member M1 includes the third sun gear S3, the second rotatable member M2 includes the second carrier PC2 and the output shaft OUT which are connected together, the third rotatable member M3 includes the third ring gear R3, the fourth member M4 includes the second ring gear R2, the fifth member M5 includes the first carrier PC1 and the second sun gear S2 which are connected together, the sixth member M6 includes the first small sun gear S12, and the seventh member M7 includes the input shaft IN. The first large sun gear S11 is directly connected to the stationary housing member M8. As in the second embodiment, the seventh member M7 of the input shaft IN is connected through the first clutch C1 to the third member M3, through the second clutch C2 to the first member M1, and through the third clutch C3 to the sixth member M6, and the stationary eighth member M8 is connected through the first brake B1 to the fifth member M5, and through the second brake B2 to the fourth member M4.

The planetary gear set constituted by the fourth, fifth and second rotatable members M4, M5 and M2 is a double pinion type (or dual planetary type) planetary gear set restricted by a double pinion type constraint equation. The planetary gear set constituted by the first, third and second rotatable members M1, M3 and M2 is a single pinion type planetary gear set restricted by a single pinion type equation. The imaginary planetary gear set constituted by the third, fourth and second rotatable members M3, M4 and M2 is a double pinion type planetary gear set. Therefore, the gear arrangement of the third embodiment is equivalent to the gear arrangement of the second embodiment, and FIGS. 5 and 6 are applicable to the third embodiment.

Figure 8:
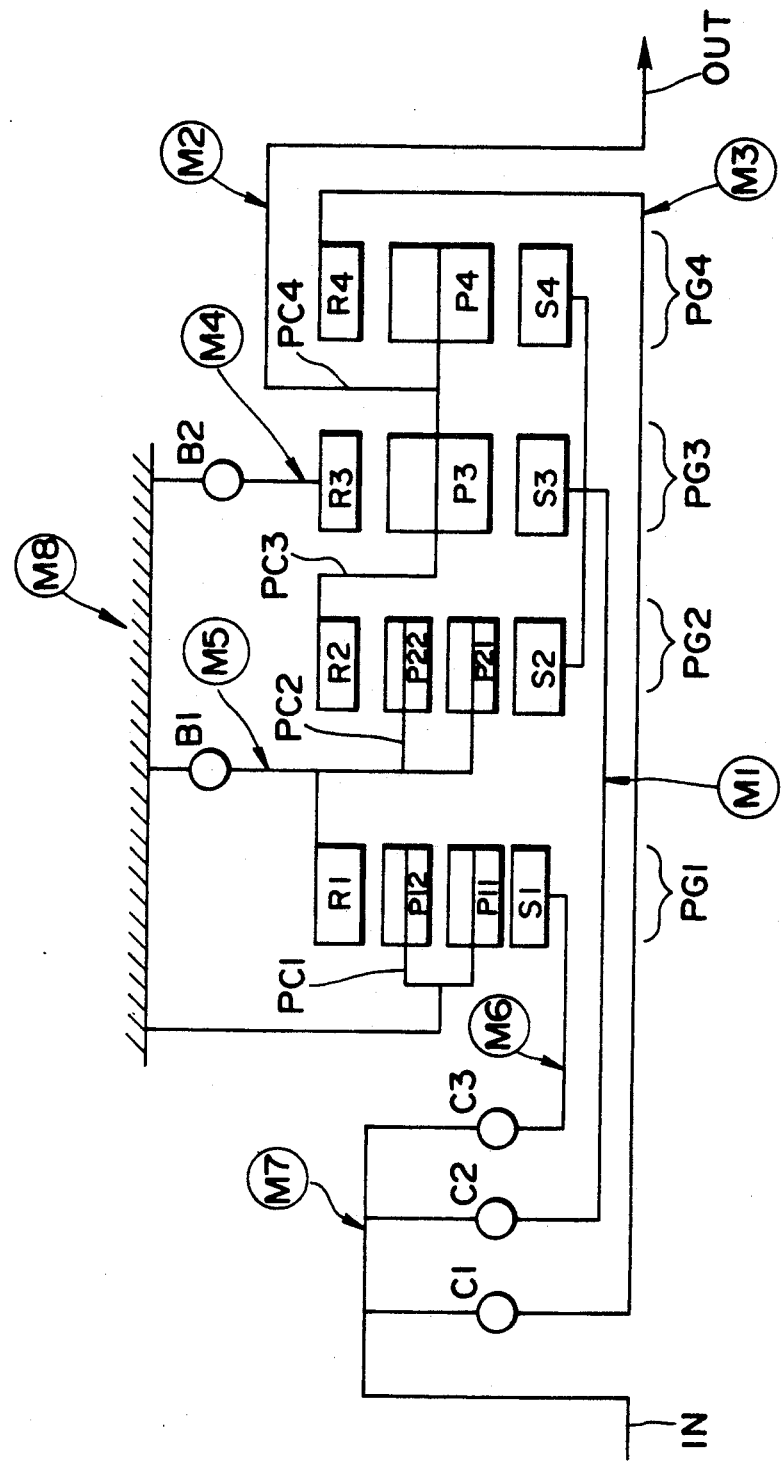
FIG. 8 is a skeleton diagram showing a planetary gear system of a fourth embodiment of the invention.

A FOURTH EMBODIMENT of the present invention is shown in FIG. 8.

The planetary gear system of the fourth embodiment has a first planetary gear set PG1 identical to the first planetary gear set PG1 of the second embodiment, and a planetary gear train consisting of a second planetary gear set PG2 of the double pinion type, a third planetary gear set PG3 of the single pinion type and a fourth planetary gear set PG4 of the single pinion type. The second, third and fourth planetary gear sets PG2, PG3 and PG4 are combined so as to form the first, second, third, fourth and fifth rotatable members M1-M5 which are related to one another in the same manner as in the second embodiment.

The first member M1 of the fourth embodiment is a one-element unit including the first active element which is composed of second, third and fourth sun gears S2, S3 and S4. The second, third and fourth sun gears S2, S3 and S4 are integrated into the first member M1, so that they rotate as a unit. The second member M2 is a two-element unit including the second active element and the output element OUT in the form of the output shaft. The second active element includes a second ring gear R2, a third planet carrier PC3, and a fourth planet carrier PC4. Thus, the second ring gear R2, the third and fourth carriers PC3 and PC4 and the output shaft OUT are integrated into the second member M2, so that they rotate as a unit. The third member M3 is a one-element unit including the third active element in the form of a fourth ring gear R4. The fourth member M4 is a one-element unit including the fourth active element in the form of a third ring gear R3. The fifth member M5 is a two-element unit including the fifth active element in the form of a second planet carrier PC2 and the seventh active element in the form of the first ring gear R1. The sixth member M6 is a one-element unit including the sixth active element in the form of the first sun gear S1. The seventh member M7 is a one-element unit including only the input element IN. The stationary eighth member M8 is a two-element unit including the housing element and the eighth active element in the form of the first planet carrier PC1. The second planet carrier PC2 carries pinion groups each including an inner second pinion P21 meshing with the second sun gear S2, and an outer second pinion P22 meshing with both the second inner pinion P21 and the second ring gear R2. The third planet carrier PC3 carries pinion units each including a third pinion P3 meshing with both the third ring and sun gears R3 and S3. The fourth planet carrier PC4 carries pinion units each including a fourth pinion P4 meshing with both the fourth ring and sun gears R4 and S4. The first, second and third clutches C1, C2 and C3 and the first and second brakes B1 and B2 are disposed in the same manner as in the second and third embodiments. FIGS. 5 and 6 are applicable to the fourth embodiment.

Figure 9:
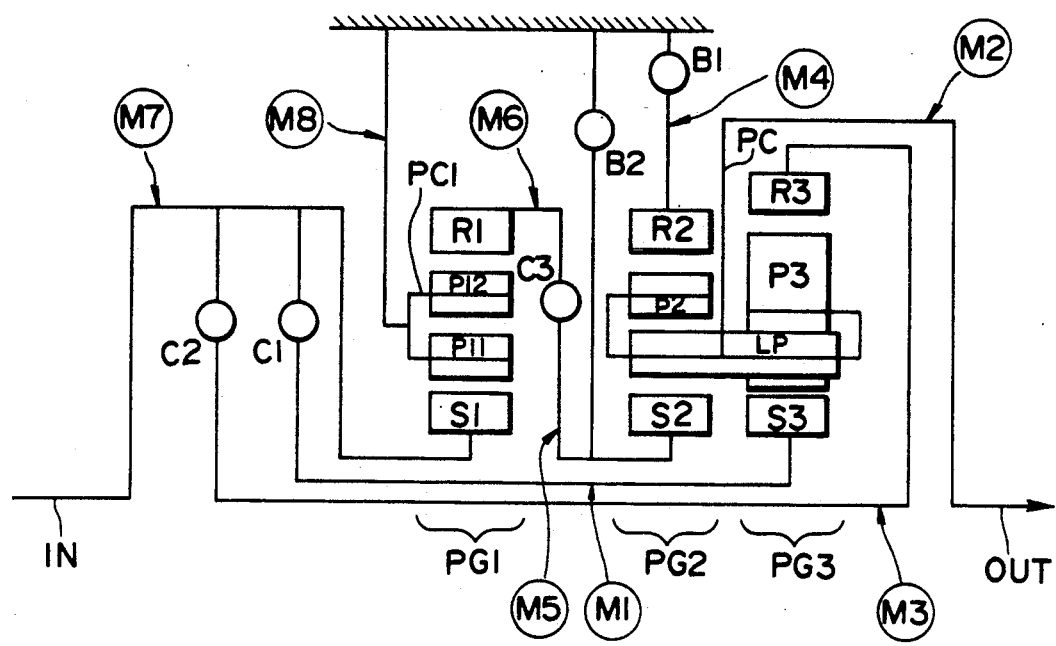
FIG. 9 is a skeleton diagram of a planetary gear system of a fifth embodiment.
Figure 10:
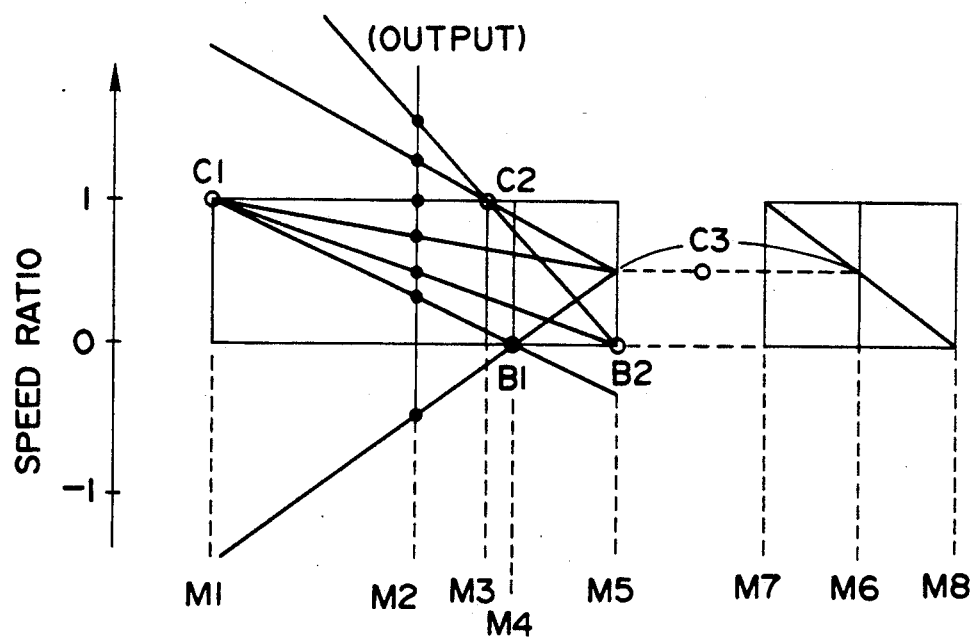
FIG. 10 is a nomographic chart of the fifth embodiment.
Figures 11, 12:
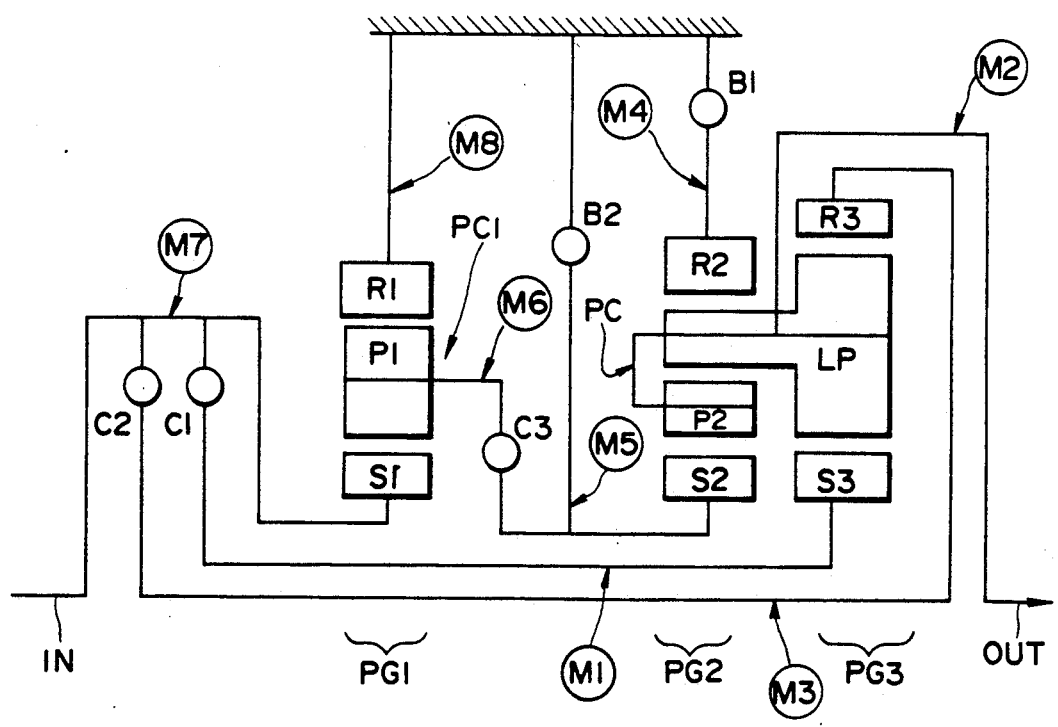
FIG. 11 is an engagement logic table of the fifth embodiment.
FIG. 12 is a skeleton diagram of a sixth embodiment.

A FIFTH EMBODIMENT of the present invention is shown in FIGS. 9, 10 and 11. The fifth embodiment is different from the second embodiment in that the fifth main selective engaging device is disposed between the first ring gear R1 and the second sun gear S2.

Like the gear systems of the preceding embodiments, the planetary gear system of the fifth embodiment includes the eleven elements which are connected by the connecting means so as to constitute the eight members, and the five main selective engaging devices which are necessary for producing six forward speeds and one reverse speed. The eleven elements are the stationary housing element constituting the gear housing, the input element in the form of an input shaft IN, the output element in the form of an output shaft OUT, and the eight active elements, such as ring gears, sun gears and planet carriers, constituting a planetary gearing.

In the fifth embodiment, the first active element is a third sun gear S3, the second active element is a common planet carrier PC, the third active element is a third ring gear R3, the fourth active element is a second ring gear R2, the fifth active element is a second sun gear S2, the sixth active element is a first ring gear R1, the seventh active element is a first sun gear S1, and the eighth active element is a first planet carrier PC1. The sixth, seventh and eighth active elements constitutes a first planetary gear set PG1 identical to that of the first embodiment. The first, second, third, fourth and fifth active elements constitute a compound planetary gear set identical to that of the first embodiment. The pinions of the fifth embodiment are the same as those of the first embodiment.

The first rotatable member M1 is a one-element unit, and includes the first active element in the form of the third sun gear S3. The second rotatable member M2 is a two-element unit, and includes the second active element in the form of the common carrier PC and the output element OUT. In the two-element unit, the two elements are connected by the connecting means so that they rotate together. The third rotatable member M3 is a one-element unit, and includes the third active element in the form of the third ring gear R3. The fourth rotatable member M4 is a one-element unit, and includes the fourth active element in the form of the second ring gear R2. The fifth rotatable member M5 of the fifth embodiment is a one-element unit, and includes only the fifth active element in the form of the second sun gear S2. The sixth rotatable member M6 is a one-element unit, and includes the sixth active element in the form of the first ring gear R1. The seventh member M7 of the fifth embodiment is a two-element unit, and includes the input element IN and the seventh active element in the form of the first sun gear S1. Therefore, the seventh active element rotates together with the input shaft IN. The eighth member M8 of the fifth embodiment is a two-element unit, and includes the stationary housing element and the eighth active element in the form of the first planet carrier PC1.

The first main selective engaging device of the fifth embodiment is a first clutch C1 disposed between the first member M1 of the third sun gear S3 and the seventh member M7 of the input shaft IN. The first clutch C1 connects the first and seventh members M1 and M7 together when it is in the engaged state, and disconnects the first member M1 from the seventh member M7 when it is in the disengaged state. The second main selective engaging device of the fifth embodiment is a second clutch C2 disposed between the third member M3 of the third ring gear R3 and the seventh member M7 of the input shaft IN. The third main selective engaging device is a first brake B1 disposed between the fourth member M4 of the second ring gear R2, and the stationary eighth member M8. The fourth main selective engaging device is a second brake B2 disposed between the fifth member M5 of the second sun gear S2 and the stationary eighth member M8. The fifth main selective engaging device of the fifth embodiment is a third clutch C3 disposed between the fifth member M5 and the sixth member M6 of the first ring gear R1. The five selective engaging devices are connected with a shift control unit, which engages and disengages the devices as shown in FIG. 11.

In the nomographic chart of FIG. 10, the second, third and fourth members M2, M3 and M4 are placed between the first and fifth members M1 and M5. The second member M2 is next to the first member M1, the third member M3 is next to the second member M2, and the fourth member M4 is between the third and fifth members M3 and M5. The four selective engaging devices C1, C2, B1 and B2 are placed, respectively, on the first, third, fourth and fifth vertical lines as shown in FIG. 10. On the righthand horizontal line segment in FIG. 10, the sixth member M6 of the first ring gear R1 is placed between the seventh and eighth members M7 and M8. In the fifth embodiment, the fifth main selective engaging device in the form of the third clutch C3 is disposed between the fifth member M5 and the sixth member M6, as shown in FIG. 10.

As shown in FIG. 11, the shift control unit of the fifth embodiment engages C1 and B1 in the first speed, C1 and B2 in the second speed, C1 and C3 in the third speed, C1 and C2 in the fourth speed, C2 and C3 in the fifth speed, C2 and B2 in the sixth speed, and B1 and C3 in the reverse. It is possible to obtain the seventh speed by engaging C2 and B1. However, the seventh speed is not employed in this embodiment. The gear system is in neutral when the number of the devices put in the engaged state is one or zero. In this embodiment, B1 is engaged in neutral in order to facilitate the shift to the first speed, and the shift to the reverse. The gear ratios obtained in the fifth embodiment are the same as those of the first embodiment.

The planetary gear system of the fifth embodiment is capable of providing optimum gear ratios without increasing the number of the required selective engaging devices, compact in size, and superior in shifting quality, as in the first embodiment. Furthermore, the planetary gear system of the fifth embodiment is advantageous in gear noize. In the fifth embodiment, the third clutch C3 is disposed between the first ring gear R1 and the fifth member M5, the first sun gear S2 is always connected with the input shaft IN, and the first planet carrier PC1 is always held to the stationary housing. Therefore, the speed ratio of the sixth member M6 with respect to the input shaft IN is held constant. Consequently, the planetary gear system of the fifth embodiment is advantageous in gear noise because it can prevent the rotations of the active elements of the first planetary gear set PG1 from becoming negative, and prevent the pinion speeds from increasing too much.

A SIXTH EMBODIMENT of the present invention is shown in FIG. 12. The relationships among the members M1-M5 and the relationships among the members M6-M8 shown in FIG. 10 are maintained in the sixth embodiment, and FIGS. 10 and 11 are applicable to the sixth embodiment. However, the first, second and third planetary gear sets PG1, PG2 and PG3 are different from those of the fifth embodiment. The first planetary gear set PG1 of the sixth embodiment is a single pinion type planetary gear set, and the second and third planetary gear sets PG2 and PG3 are identical to those of the third embodiment shown in FIG. 7.

The first, third, fourth and fifth members M1, M3, M4 and M5 are one-element units, and includes, respectively, the third sun gear S3, the third ring gear R3, the second ring gear R2, and the second sun ear, as in the fifth embodiment. The second member M2 is a driven member including the common carrier PC and the output shaft OUT.

The sixth member M6 of the sixth embodiment includes a first planet carrier PC1 which carries pinion units each including a first pinion P1 meshing with both the first sun gear S1 and the first ring gear R1. The seventh member M7 is a driving member, and includes the input shaft IN, and the first sun gear S1. The stationary eighth member M8 includes the first ring gear R1.

In the sixth embodiment, the number of pinions is decreased as compared with the fifth embodiment.

Figure 13:
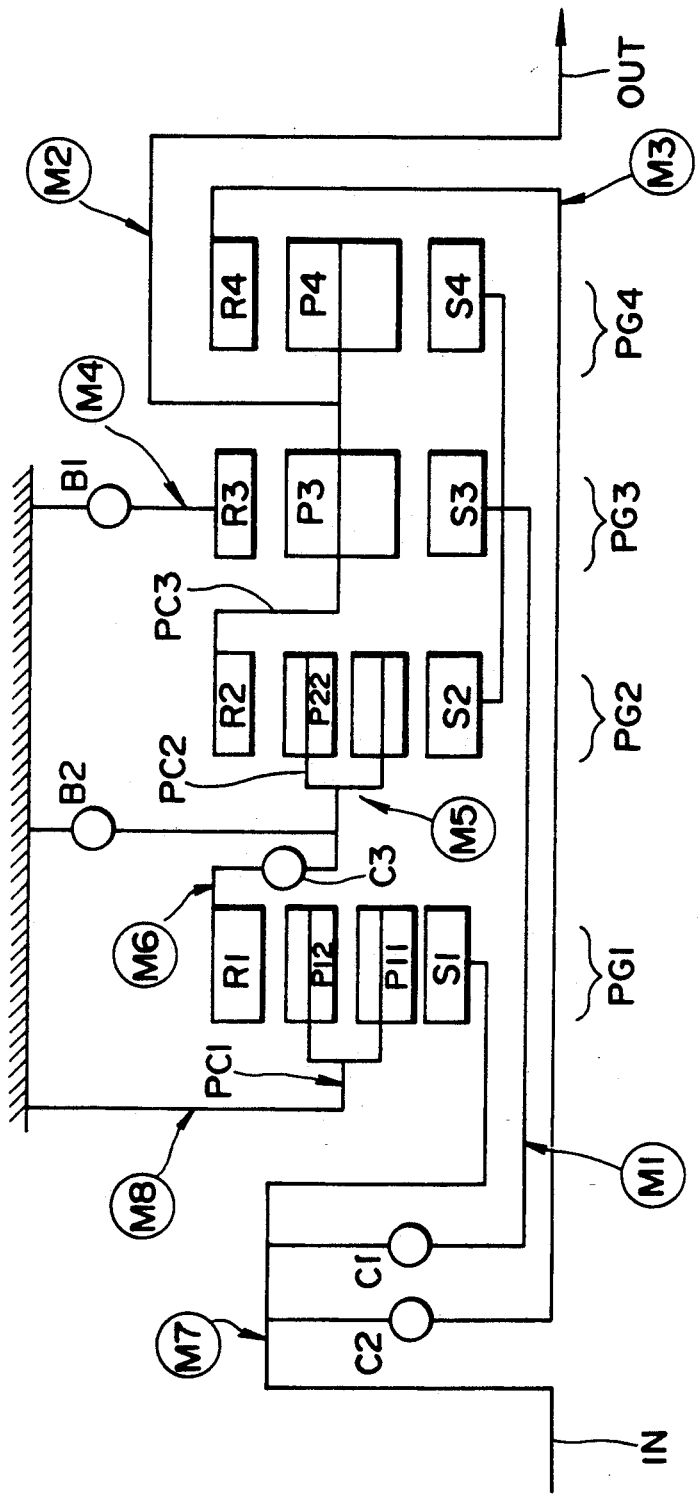
FIG. 13 is a skeleton diagram of a seventh embodiment.
Figure 14:
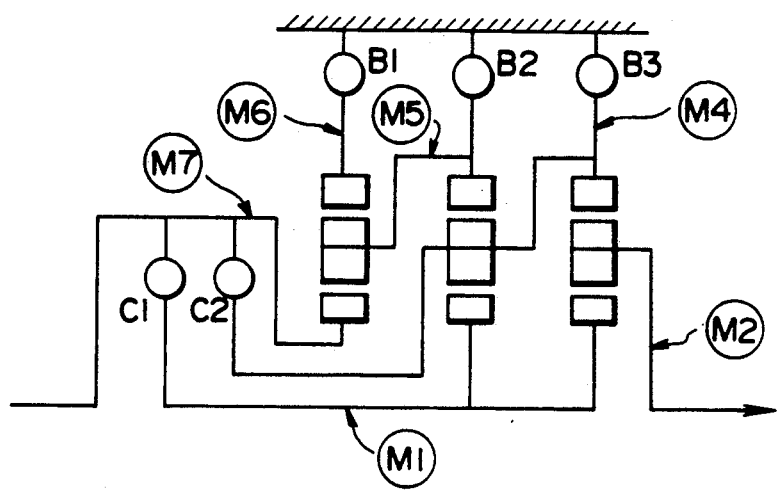
FIG. 14 is a skeleton diagram showing a planetary gear system of a conventional example.

A SEVENTH EMBODIMENT is shown in FIG. 13.

FIG. 10 and FIG. 11 are also applicable to the seventh embodiment. The planetary gear arrangement of the seven embodiment is identical to that of the fourth embodiment shown in FIG. 8. The gear arrangement of the seventh embodiment includes the four planetary gear sets PG1-PG4 each of which is a simple planetary gear set.

Unlike the fourth embodiment, the third clutch C3 of the seventh embodiment is disposed between the first ring gear R1 and the fifth member M5 including the second planet carrier PC2. The sixth member M6 of the seventh embodiment includes the first ring gear R1. The seventh member M7 is a driving member, and includes the input shaft IN and the first sun gear S1. The stationary eighth member M8 includes the first planet carrier PC1.

What is claimed is:
1. A planetary gear system comprising;
   a stationary housing element;
   an input element for receiving a input rotation,
   an output element for delivering an output rotation;
   a planetary gear arrangement connected between said input and output elements for providing a plurality of forward gear ratios and one reverse gear ratio, said planetary gear arrangement comprising first, second, third, fourth, fifth, sixth, seventh and eighth active rotatable elements;
   a means for connecting said elements so as to form first, second, third, fourth, fifth, sixth, seventh and eighth members, said eighth member comprising said stationary housing element and being stationary, each of said first, second, third, fourth, fifth, sixth and seventh members being rotatable, as a unit, relative to said stationary element; and first, second, third, fourth and fifth selective engaging devices each of which is disposed between two of said members for connection and disconnection therebetween;

wherein said first member comprises said first active element, said second member comprises said second active element and said output element, said third member comprises said third active element, said fourth member comprises said fourth active element, said fifth member comprises said fifth active element, said sixth member comprises said sixth active element, said seventh member comprises said input element, wherein said first, second, third, fourth and fifth active elements form a primary planetary gear train and are geared so that, in a nomographic chart, said first, second, third, fourth and fifth active elements are arranged in order of mention, and said sixth, seventh and eighth active elements are arranged to form an auxiliary planetary gear set, said fifth active element of said primary planetary gear train being connected with one of said sixth, seventh and eighth active elements of said auxiliary planetary gear set, and wherein said first engaging device is disposed between said first and seventh members, said second engaging device is disposed between said third and seventh members, said third engaging device is disposed said fourth and eighth members, and said fourth engaging device is disposed between said fifth and eighth members.

2. A planetary gear system according to claim 1 wherein said engaging devices are arranged so that a shift between any two adjacent forward gear ratios can be accomplished by changing a first one of said devices from an engaged state to an disengaged state, and a second one of said devices from the disengaged state to the engaged state, and holding the remaining three of said devices unchanged.

3. A planetary gear system according to claim 1 wherein said seventh, fifth and sixth members are geared so that, in a nomographic chart, said seventh, fifth and sixth members are arranged in order of mention, and wherein said fifth engaging device is disposed between said sixth and eighth members.

4. A planetary gear system according to claim 3 wherein said first, second, third, fourth and fifth members constitute a compound planetary gear set, and said seventh, fifth and sixth members constitute a simple planetary gear set.

5. A planetary gear system according to claim 3 wherein said system further comprises a first one-way clutch connected in series with said first engaging device and an auxiliary clutch connected in parallel with a series combination of said first engaging device and said first one-way clutch between said first member and said input element.

6. A planetary gear system according to claim 3 wherein said gear system further comprises a one-way clutch connected in parallel to said third engaging device between said fourth member and said housing element.

7. A planetary gear system according to claim 1 wherein said eighth, fifth and sixth members are geared so that, in a nomographic chart, said eighth, fifth and sixth members are arranged in order of mention, and wherein said fifth engaging device is disposed between said sixth and seventh members.

8. A planetary gear system according to claim 7 wherein said first, second, third, fourth and fifth members constitute a compound planetary gear set, and said eighth, fifth and sixth members constitute a simple planetary gear set.

9. A planetary gear system according to claim 1 wherein said seventh, sixth, and eighth members are geared so that, in a nomographic chart, said seventh, sixth and eighth members are arranged in order of mention, and wherein, said fifth engaging device is disposed between said fifth and sixth members.

10. A planetary gear system according to claim 9 wherein said first, second, third, fourth, and fifth members constitute a compound planetary gear set, and said sixth, seventh and eighth members constitute a simple planetary gear set.

11. A planetary gear system comprising:

a stationary housing element, an input element for receiving a input rotation;

an output element for delivering an output rotation;

a planetary gear arrangement connected between said input and output elements for providing a plurality of forward gear ratios and one reverse gear ration, said planetary gear arrangement comprising a plurality of active rotatable elements;

a means for connecting said elements so as to form first, second, third, fourth, fifth, sixth, seventh and eighth members, said eighth member comprising said stationary housing element and being stationary, each of said first, second, third, fourth, fifth, sixth and seventh members being rotatable, as a unit, relative to said stationary element;

first, second, third, fourth and fifth selective engaging devices each of which is disposed between two of said members for connection and disconnection therebetween;

wherein said planetary gear arrangement comprises first, second, third, fourth, fifth, sixth, seventh, and eight active elements each of which functions as one of a ring gear, a sun gear and a planet carrier, five of said first, second, third, fourth, fifth, sixth, seventh and eighth members being one-element units each including only one element, and the remaining three of said members being two-element units each including two elements;

wherein said system further comprises a shift control means for producing each of said forward gear ratios by engaging two of said devices and disengaging the remaining three of said devices, and effecting each shift between two adjacent forward gear ratios by holding one of said devices continuously in an engaged state;

wherein said first, second, third, fourth, and fifth active element constitute a planetary gearing such that, when said first element is driven at a first speed and said fifth element is held, then said second, third and fourth elements rotate, respectively, at a second speed lower than said first speed, a third speed lower than said second speed, and a fourth speed lower than said third speed, and said sixth, seventh and eighth active elements constitute a planetary gearing, and;

wherein said first member is a first one-element unit including said first active element, said second member is a first two-element unit including said second active element and said output element, said third member is a second one-element unit including said third active element, said fourth member is a third one-element unit including said fourth active element, said fifth member comprises said fifth active element, and said sixth member is a fourth one-element unit including said sixth active element, and said seventh member comprises said input element, and wherein a first one of said fifth, seventh and eighth members is a fifth one-element unit, a second one of said fifth, seventh and eighth members is a second two-element unit comprising said seventh active element, and a third one of said fifth, seventh and eighth members is a third two-element unit comprising said eighth active element.

12. A planetary gear system according to claim 11 wherein said first selective engaging device is disposed between said first and seventh members, said second selective engaging device is disposed between said third and seventh members, said third selective engaging device is disposed between said fourth and eighth members, said fourth selective engaging device is disposed between said fifth and eighth members, and said fifth selective engaging device is disposed between said sixth member and said fifth one-element unit.

13. A planetary gear system according to claim 12 wherein said fifth member is said second two-element unit including said fifth and seventh active elements, and said sixth, seventh and eighth active elements constitute said planetary gearing such that, when one of said sixth and eighth elements is driven at an input speed, and the other of said sixth and eighth element is held, then said seventh element rotates at a speed lower than said input speed.

14. A planetary gear system according to claim 13 wherein said seventh member is said third two-element unit including said input element and said eighth active element.

15. A planetary gear system according to claim 14 wherein said seventh active element includes a first ring gear, said eighth active element includes a first sun gear, and said sixth active element includes a first planet carrier carrying an outer first pinion meshing with said first ring gear, and an inner first pinion meshing with both said first sun gear and said outer first pinion, and wherein said first active element includes a third sun gear, said second active element includes a common planet carrier carrying a short second pinion, a short third pinion meshing with said third sun gear and a long pinion meshing with both said second and third pinions, said third active element includes a third ring gear meshing with said third pinion, said fourth active element includes a second ring gear meshing with said second pinion, and said fifth active element includes a second sun gear meshing with said long pinion.

16. A planetary gear system according to claim 15 wherein said system further comprises a first one-way clutch connected in series with said first selective engaging device, a sixth selective engaging device connected in parallel to a series combination of said first selective engaging device and said first one-way clutch, between said first and seventh members, and a second one-way clutch connected in parallel to said third selective engaging device, between said fourth and eighth member.

17. A planetary gear system according to claim 16 wherein said input element is in the form of an input shaft, and said output element is in the form of an output shaft placed in line with said input shaft.

18. A planetary gear system according to claim 13 wherein said seventh member is said fifth one-element unit including only said input element, said fifth selective engaging device is disposed between said seventh member and said sixth member which is a fourth one-element unit including said sixth active element, and said eighth member is said third two-element unit including said stationary housing element and said eighth active element.

19. A planetary gear system according to claim 18 wherein said sixth active element includes a first sun gear, said seventh active element includes a first ring gear, said eighth active element includes a first planet carrier carrying an inner first pinion meshing with said first sun gear and an outer first pinion meshing with both said inner first pinion and said first ring gear, said first active element includes a third sun gear, said second active element includes a common planet carrier carrying a short second pinion, a short third pinion and a long pinion meshing with both said second and third pinions, said third active element includes a third ring gear meshing with said third pinion, said fourth active element includes a second ring gear meshing with said second pinion, and said fifth active element includes a second sun gear meshing with said long pinion.

20. A planetary gear system according to claim 18 wherein said sixth active element includes a small first sun gear, said seventh active element includes a first planet carrier carrying a first long pinion and a first short pinion meshing with both said first long pinion and said small first sun gear, said eighth active element includes a large first sun gear meshing with said first long pinion, said first active element includes a third sun gear, said second active element includes a common planet carrier carrying a short second pinion and a second long pinion having a small portion meshing with said second pinion and a large portion meshing with said third sun gear, said third active element includes a third ring gear meshing with said large portion of said second long pinion, said fourth active element includes a second ring gear meshing with said small portion of said second long pinion, and said fifth active element includes a second sun gear meshing with said second pinion.

21. A planetary gear system according to claim 18 wherein said sixth active element includes a first sun gear, said seventh active element includes a first ring gear, said eighth active element includes a first planet carrier carrying an inner first pinion meshing with said first sun gear and an outer first pinion meshing with both said inner first pinion and said first ring gear, said first active element includes second, third and fourth sun gears, said second active element includes a second ring gear and a common carrier carrying a third pinion meshing with said third sun gear and a fourth pinion meshing with said fourth sun gear, said third active element includes a fourth ring gear meshing with said fourth pinion, said fourth active element includes a third ring gear meshing with said third pinion, and said fifth active element includes a second planet carrier carrying an inner second pinion meshing with said second sun gear and an outer second pinion meshing with both said inner second pinion and said second ring gear.

22. A planetary gear system according to claim 12 wherein said fifth member is said fifth one-element unit including only said fifth active element, said fifth selective engaging device is disposed between said fifth and sixth members, said seventh member is said second two-element unit including said input element and said seventh active element, and said eighth member is said third two-element member including said stationary housing element and said eighth active element, and wherein said sixth, seventh and eighth active elements constitute said planetary gearing such that, when one of said seventh and eighth active elements is driven at an input speed, and the other of said seventh and eighth elements is held, then said sixth element rotates at a speed lower than said input speed.

23. A planetary gear system according to claim 22 wherein said sixth active element includes a first ring gear, said seventh active element includes a first sun gear, said eighth active element includes a first planet carrier carrying an inner first pinion meshing with said first sun gear and an outer first pinion meshing with both said inner first pinion and said first ring gear, said first active element includes a third sun gear, said second active element includes a common carrier carrying a short second pinion, a short third pinion meshing with said third sun gear and a long pinion meshing with both said second and third pinions, said third active element includes a third ring gear meshing with said third pinion, said fourth active element includes a second ring gear meshing with said second pinion, and said fifth active element includes a second sun gear meshing with said long pinion.

24. A planetary gear system according to claim 22 wherein said sixth active element includes a first planet carrier carrying a first pinion, said seventh active element includes a first sun gear meshing with said first pinion, said eighth active element includes a first ring gear meshing with said first pinion, said first active element includes a third sun gear, said second active element includes a common planet carrier carrying a short second pinion and a long pinion having a small portion meshing with said second pinion and a large portion meshing with said third sun gear, said third active element includes a third ring gear meshing with said large portion of said long pinion, said fourth active element includes a second ring gear meshing with said small portion of said long pinion, and said fifth active element includes a second sun gear meshing with said second pinion.

25. A planetary gear system according to claim 22 wherein said sixth active element includes a first ring gear, said seventh active element includes a first sun gear, said eighth active element includes a first planet carrier carrying an inner first pinion meshing with said first sun gear and an outer first pinion meshing with both said inner first pinion and said first ring gear, said first active element includes second, third and fourth sun gears, said second active element includes a second ring gear and a common carrier carrying a third pinion meshing with said third sun gear and a fourth pinion meshing with said fourth sun gear, said third active element includes a fourth ring gear meshing with said fourth pinion, said fourth active element includes a third ring gear meshing with said third pinion, and said fifth active element includes a second planet carrier carrying an inner second pinion meshing with said second sun gear and an outer second pinion meshing with both said inner second pinion and said second ring gear.

26. A planetary gear system comprising:
a stationary housing element;
an input element for receiving an input rotation;
an output element for delivering an output rotation;
a planetary gear arrangement connected between said input and output elements for providing a plurality of forward gear ratios and at least one reverse gear ratio, said planetary gear arrangement comprising a primary planetary gear ratio, said planetary gear arrangement comprising a primary planetary gear train comprising first, second, third, fourth and fifth active elements each of which functions as one of a ring gear, sun gear and planet carrier, and an auxiliary gear set comprising sixth, seventh and eighth active elements each of which functions as one of a ring gear, sun gear and planet carrier;
a connecting means for connecting said elements and forming a first member comprising said first active element, a second member comprising said second active element and said output element, a third member comprising said third active element, a fourth member comprising said fourth active element, a fifth member comprising said fifth active element, a sixth member comprising one of said sixth, seventh and eighth active elements, a seventh member comprising said input element, and an eighth member comprising said stationary housing element, said eighth member being always stationary, each of said first, second, third, fourth, fifth, sixth, and seventh members being rotatable, as a unit, relative to one another and relative to said stationary housing element; and
a main device group comprising first, second, third and fourth selective engaging devices each of which is disposed between two of said members for connection and disconnection therebetween;
wherein said primary planetary gear train further comprises a primary planet pinion means for connecting said first, second, third, fourth and fifth active elements with one another by gearing and enabling said first active element to drive said second element at a speed lower than the speed of said first element, said third element at a speed lower than the speed of said second element, and said fourth speed at a speed lower than the speed of said third element if said first element is driven by said input element and said fifth element is held;
wherein said auxiliary planetary gear set further comprising an auxiliary planet pinion means for connecting said sixth, seventh and eighth active element by gearing, and transmitting rotation between two of said sixth, seventh and eighth active elements if the remaining one of said sixth, seventh and eighth active elements is held; and
wherein said planetary gear system further comprises a combining means for combining said primary planetary gear train and said auxiliary planetary gear set by connecting said fifth active element of said primary planetary gear train with one of said sixth, seventh and eighth active elements of said auxiliary planetary gear set.

27. A planetary gear system according to claim 26 wherein said main device group comprises a first selective engaging device disposed between said first member and said seventh member, a second selective engaging device disposed between said third member and said seventh member, a third selective engaging device disposed between said fourth member and said eighth member, and a fourth selective engaging device disposed between said fifth member and said eighth member.

28. A planetary gear system according to claim 27 wherein said combining means comprises a fifth selective engaging device for putting said auxiliary planetary gear set in a constraining state in which a first one of said sixth, seventh and eighth active elements is a driving element driven by said input element, a second one of said sixth, seventh and eighth active elements is a held element held stationary, and a third one of said sixth, seventh and eight active elements is an intermediate driven element which is driven at a speed lower than the speed of the driving element by said driving element and which is connected with said fifth element so that said fifth active element and said intermediate element rotate together.

29. A planetary gear system according to claim 28 wherein said system further comprises a shift control means for producing each of said forward gear ratios by engaging two of said devices and disengaging the remaining three of said devices, and effecting each shift between two adjacent forward gear ratios by holding one of said devices continuously in an engaged state.

30. A planetary gear system according to claim 28, wherein said sixth member comprises said sixth active element, and said fifth device is disposed between said sixth element, and one of said housing, input and fifth active elements.

31. A planetary gear system according to claim 30 wherein a first one of said fifth, seventh and eighth members further comprises a first one of said seventh and eighth elements, and a second one of said fifth, seventh and eighth members further comprises a second one of said seventh and eighth elements, and a third one of said fifth, seventh and eighth members is a one-element unit.

32. A planetary gear system according to claim 28 wherein said first, second, third, fourth, fifth, sixth, seventh and eighth active elements are arranged so that, when said third engaging device and said fifth engaging device are both engaged, the driving element of said auxiliary planetary gear set in the constraining state drives said intermediate element and said fifth element at an intermediate speed lower than a speed of said input element, and said fifth element drives said second member in a reverse direction.

33. A planetary gear system according to claim 28 wherein said first, second, third, fourth and fifth active elements are geared so that, when said first active element is driven at an input speed by said input element, and one of said third and fourth engaging devices is engaged, then said second member is driven at a forward underdrive speed lower than the input speed.

34. A planetary gear system according to claim 33 wherein said first, second, third, fourth, fifth, sixth seventh and eighth active elements are arranged so that, when said fifth engaging device is engaged, and one of said first and second engaging devices is engaged, said first, second, third, fourth and fifth members rotate, respectively, at a first speed, a second speed lower than said first speed, a third speed lower than said second speed, a fourth speed lower than said third speed and a fifth speed lower than said fourth speed.

35. A planetary gear system according to claim 33 wherein said first, second, third, fourth and fifth active elements are geared so that, when said first and second engaging devices are engaged, all of said first, second, third, fourth and fifth members rotate together at an equal speed.

36. A planetary gear system according to claim 38 wherein said first, second, third, fourth and fifth active element are geared so that a forward overdrive speed ratio is obtained when said second and fourth engaging devices are engaged.

* * * * *